United States Patent Office 2,937,072
Patented May 17, 1960

2,937,072

MULTI-STAGE ADSORPTION OF PENTAVALENT VANADIUM VALUES ON ANION EXCHANGE RESINS

Daniel C. McLean, Springdale, Conn., assignor to American Cyanamid Company, New York, N.Y., a corporation of Maine No Drawing. Application August 9, 1955
Serial No. 527,400

8 Claims. (Cl. 23—19)

This invention relates to an improved method of recovering vanadium from acid leach liquors containing it.

The recovery of vanadium from many of its ores such as carnotite has presented a considerable problem both because the ore is often lean and frequently the vanadium is associated with compounds of other metals such as iron.

It is common to treat ores containing both vanadium and uranium with sulfuric acid to form an acid leach liquor. After separation of the uranium by conventional procedures, with which this invention is not concerned, a strongly acid liquor remains having a fairly low vanadium content, of the order of 3–5 grams per liter of $V_2O_5$. The recovery of the vanadium from such leach liquors, which frequently contain at least as much as or more iron salts, has presented a serious economic problem.

It has been proposed to adsorb the vanadium on strong base ion exchange resins by passing the liquor over the resins in conventional multi-stage column operations. These proposals when tried out in practice have proven to be economically impractical. The rate of adsorption of vanadium on the resin at low temperatures (for example, 25–30° C.) is so slow that if it is desired to obtain a practical percentage of recovery, the time of contact with the resin is excessive. Thus, for example, with a contact time of the order of 20–24 hours, very satisfactory percentage recovery is obtainable but the output from a given piece of equipment is so low as to render the capital investment prohibitive. Increasing the temperature in the columns, for example, to from 50–70° C., results in a very great increase in adsorption rate and theoretically it should be possible to obtain satisfactory barren effluents and hence high percentage recoveries with column retention times of the order of 8–15 minutes which would represent an equipment utilization that is economically attractive. Unfortunately at the temperatures at which the adsorption rate of vanadium values on the resin is sufficiently rapid to permit practical outputs, a reaction takes place in the column resulting in the precipitation of a polyvanadate which is known in the mineral dressing art as "red cake." Once transformed into this compound it is not practical to remove the polyvanadate from the resin and the column plugs up. As a result, attempts to recover vanadium from acid leach liquors have been abandoned practically.

The present invention makes it possible to recover vanadium values from leach liquors by adsorption on anion exchange resins, particularly strong base anion exchange resins, with satisfactory output, high yields and no interference by red cake precipitation. Essentially the present invention utilizes a series of columns which is the practical type of equipment for resin adsorption in any event. However, the first column which encounters the strong leach liquor is operated at a low temperature and below that at which red cake precipitation results. The temperature is not critical and can be as low as room temperature, preferably it is slightly above, from 25–35° C. but not exceeding 40° C. The subsequent column or columns are operated at temperatures for high adsorption rates and to produce effluents which have very low vanadium content. In other words, the subsequent columns are operated at temperatures in the range of 50–70° C. Higher temperatures can be used, but in many cases introduce problems because of resin softening and other factors. Any softening of the resin is apt to lead to the sticking together of resin beads which makes the column inoperative. No red cake precipitation takes place although the temperatures used are those at which the precipitation rendered earlier attempts useless. It is not known exactly what mechanism results in the red cake precipitation. It is therefore not desired to limit the invention to any particular theory. I believe that the concentration of the vanadium values in the liquor is a very important factor and may be the only one. In any event, the liquor leaving the cool column has given up a considerable proportion of its vanadium content to the resin. Retention time in the columns of from 8–15 minutes and in most cases of the order of 10 minutes are preferred. In spite of this very short retention time, the concentration of vanadium values on the resin in the cool column builds up to a satisfactory figure which is well in excess of 100 grams of $V_2O_5$ per liter of resin and under favorable circumstances may be as high as 130–140 grams. Why it is possible to build up a high concentration of vanadium values on the resin in the cool column is not fully known. Apparently there is an enormous decrease in adsorption rate when the concentration of vanadium values in the liquor falls. I believe that this is the reason why the use of cool columns throughout was economically impractical. It is possible that other factors play a part, but this seems to be the most reasonable explanation. It is surprising, however, that decrease of the adsorption is so enormously high, for the difference of 8–15 minutes retention time under the present invention and the 20–24 hours required with an all-cool resin system to obtain the same recovery is several orders of magnitude.

It is an advantage of the present invention that the methods of operating resin adsorption columns are in no way changed except, of course, for the temperature difference between the first column or columns and the remaining ones. I believe that a possible reason for the tremendous drop in adsorption rate as operating temperatures are lowered may be in part due to the fact that in the leach liquor vanadium may be present both in anionic and cationic forms. It is only the anionic form of vanadium which can be adsorbed by the anion exchange resins. The very low pH of the leach liquor, which is normally below 2, tends to push the equilibrium toward the side of cationic vanadium. I believe that the adsorption upsets this equilibrium which is then restored permitting the adsorption of more vanadium values. If this is the correct explanation, that is to say, if this is the only factor, then apparently at the lower temperatures there is an enormously lower rate of re-establishment of equilibrium when part of the vanadium values have been adsorbed, and the restoration of equilibrium at higher temperatures is enormously increased. The difference between 10 minutes and 20 hours represents a factor of 120. If the restoration of equilibrium followed the ordinary rule of doubling for every 10° C., one would expect a factor of only about 8 going from 30–60° C. Apparently some other factor must be operative to produce so strikingly different a result. What this other factor is has not been determined.

It should be understood that the pH of the leach liquor is an important factor although it involves no practical difficulties because the pH ranges within which best operation takes place happen to be those of a normal acid leach liquor. I prefer to operate with pH's not greatly in excess of 1.6, the optimum range being from about 1.3–1.6 although this exact range need not be controlled in practical operation. If the pH rises above 2, difficulties are encountered with precipitation of insoluble vanadium compounds such as ferric vanadate in the hot columns even with the lower vanadium concentration which exists in the effluent from the cold column. There is a practical lower limit to pH. If it goes greatly below 1.3 the rate of adsorption of vanadium in the cool and hot columns falls to a point where degree of adsorption becomes uneconomical. There is no sharp change, as this effect is a gradual one with lowering pH.

The above description of the present invention has emphasized leach liquors obtained from carnotite to the extent that carnotite is processed for the recovery of uranium, the uranium barren leach liquor constitutes a very cheap raw material for the present process. However, it is an important advantage of the present invention that it is in no sense tied up with ores which contain uranium as well as vanadium and for the first time makes the acid leach treatment feasible on ores in which vanadium is the only worthwhile recoverable value. The field of vanadium ores which can be practically exploited is therefore greatly widened as the economical leaching and resin adsorption processes now become feasible with a wide range of ores. Another important field which is opened by the present invention is the recovery of vanadium from industrial wastes. In many cases, for example in the case of spent vanadium catalysts, vanadium recovery has been uneconomical. It is now possible to treat many of these industrial wastes to recover their vanadium content at a reasonable cost.

The anion exchange resins in general do not adsorb vanadium except in pentavalent form, therefore leach liquors to be used in the process of the present invention should contain their vanadium substantially all in the pentavalent form and in the case of any leach liquors which contain substantial amounts of vanadium of a lower valence, they should be subjected to suitable oxidation, for example by sodium chlorate, in order to transform substantially all of the vanadium into the pentavalent form.

The invention will be described in greater detail in conjunction with the following specific examples. In the examples the abbreviation g./l. is used for grams per liter.

Example 1

Two adsorption columns connected in series were filled with 20 mesh strong base anion exchange resin of the quaternary ammonium polystyrene-divinyl benzene type, described in U.S. Patent No. 2,591,573 and sold by Rohm and Haas under the designation XE-123. An acid leach liquor containing 3.45 g./l. $V_2O_5$, 4.15 g./l. iron and slightly under 1 g./l. CaO and having a pH 1.65 was passed in series through the two columns at a rate providing a retention time in each column of 8 minutes. The first column was maintained at 25° C. the second column at 65° C. Flow was maintained until 55 column volumes had gone through. At the end of the cycle the resin loading in the cool column was 111 g./l. $V_2O_5$ and 1 g./l. Fe, the effluent from the hot column analyzed at 0.26 g./l. $V_2O_5$ which corresponds to a recovery of 94%. At this point the first column was cut out, a second fresh column at 65° C. introduced in series, and the original second column cooled to 25° C. and the cycles continued.

Example 2

An acid leach liquor having a pH of 1.55 and a content in g./l. $V_2O_5$ 2.77, Fe 4.00 and CaO 0.8 was circulated through two columns in series, charged with the same resin as in Example 1, the first column being maintained at 30° C. and the second at 55–60° C.

The retention time in each column was 10 minutes and flow continued until 54 column volumes had passed through. At this point the resin loading in the cool column in g./l. was $V_2O_5$ 134.0, and Fe 1.22. The effluent from the hot column analyzed 0.4 g./l. $V_2O_5$ corresponding to a yield of 85.5%.

Example 3

The procedure of the foregoing examples was repeated using 35 mesh strong cross-linked polyvinyl quaternary ammonium anion resin sold by the Permutit Company under the designation XAX-614B. The leach liquor had a pH of 1.5 and vanadium and iron contents in g./l. of 2.73 and 3.35 respectively. The first column was maintained at 28° C. and the second at 55° C. Retention time was 10 minutes. When the cycle was completed after 60 column volumes, the resin in the first column showed a loading in g./l. of $V_2O_5$ 138, Fe 3.5. The barren effluent from the second column analyzed .34 g./l. $V_2O_5$, representing a recovery of 88%.

Example 4

The procedure of Example 3 was repeated raising the temperature of the first column to 40° C. The liquor had the following analysis in g./l. $V_2O_5$ 2.87, Fe 2.82. After a cycle of the same length as in the preceding example, the resin in the first column showed the following loadings in g./l.: $V_2O_5$ 185, Fe 4.4. The barren effluent from the second column analyzed 0.3 g./l. $V_2O_5$ representing a recovery of 89.5%. This example represents approximately the maximum temperature practical in the first column.

Example 5

An operation was carried out using the 20 mesh strong base anion exchange resin XE-123. A leach liquor from the uranium-vanadium ore from the Lukachukai district of New Mexico, removing uranium, had the following assays in g./l.: $V_2O_5$ 3.97, Fe 3.7, $U_3O_8$ 0.1, CaO 0.8, $P_2O_5$ 0.23. The pH was 1.5. The first column was maintained at 30° C. and the second column 50–55° C. Retention time in each column was 8 minutes. When the cycle was finished at 61 column volumes, the resin in the first column had the following loadings in g./l.: $V_2O_5$ 121, Fe 1.2. The barren effluent from the second column analyzed 0.27 g./l $V_2O_5$ corresponding to a yield of 93%. This example illustrated the general observation that the barren effluent contains about the same amount of $V_2O_5$ regardless of changes in the content in the feed liquor.

The present invention is not concerned with the method by which the adsorbed vanadium is eluted from the resin and any satisfactory method of elution may be used. The elution, however, has created a problem in the past and it is preferable to use the efficient eluting processes described and claimed in my copending application, Serial No. 527,401, filed August 9, 1955, in which elution is effected with a sulfurous acid solution of low pH circulated through the resin so rapidly that precipitation of the vanadium on the resin in unelutable form does not take place. The present invention is not limited to the use of this improved elution process but the high loadings of the resin with vanadium lend themselves to elution by the above improved method.

I claim:

1. In a process of recovering vanadium values by adsorption on fixed beds of anion exchange resin from acid leach liquors containing vanadium compounds in pentavalent form and having a pH from 1.3 to 2.0, the content of pentavalent vanadium compound being sufficiently high so as to precipitate insoluble polyvanadates when contacted, at temperatures exceeding 40° C., with a fixed bed of anion exchange resin, the improvement which comprises circulating said leach liquor in series through a plurality of beds of anion exchange resin, the temperature of the leach liquor being maintained at a temperature below 40° C. during passage at least through the first and relatively cold bed of anion exchange resin, maintaining the contact of the leach liquor with the resin at the said temperature until the resin adsorbs sufficient vanadium containing values to reduce the content of vanadium compound in the leach liquor below the point at which precipitation of insoluble polyvanadates at a temperature of at least 50° C. occurs and then contacting the so-treated liquor with its reduced content of vanadium compound with at least one other and relatively hot bed of anion exchange resin maintained at a temperature above 50° C. until most of the remaining vanadium compounds have been adsorbed by the resin at such elevated temperature.

2. In a process of recovering pentavalent vanadium compounds from acid leach liquors having a pH between 1.3 and 1.6 and a content of vanadium compound, calculated as $V_2O_5$, of 2.5 to 5.0 grams per liter, which content is sufficiently high to precipitate insoluble polyvanadates when contacted with a fixed bed of anion exchange resin at a temperature exceeding 40° C., the leach liquor being circulated in series through a plurality of beds of anion exchange resin to adsorb the vanadium radicals on the resin, the improvement which comprises first contacting the leach liquor with at least one bed of said resin at a temperature between 25° C. and 30° C., maintaining the leach liquor in contact with the resin until the resin adsorbs sufficient vanadium values to reduce the vanadium compound content of the leach liquor below the point at which precipitation of insoluble polyvanadates occurs on contact with anion exchange resin beds between 50° C. and 70° C. and then circulated through at least one other bed of anion exchange resin maintained at a temperature between 50° C. and 70° C., the time of contact being sufficient to remove most of the remaining vanadium compound from the leach liquor at such elevated temperatures.

3. The process of claim 1 wherein the leach liquor is circulated in series through the plurality of beds of anion exchange resin at said controlled temperatures until the vanadium loading of the first, cold bed of resin has reached a relatively high value, the first, so-loaded bed of resin is removed from the series, the first hot bed of resin is cooled to below 40° C., a fresh bed of resin heated to a temperature above 50° C. is added at the end of the series and the cycle is repeated by introducing the leach liquor to the first, cold bed of resin in the new series so formed.

4. The process of claim 3 in which the cyclic process is operated until the resin of the first, cold bed contains at least 100 grams of $V_2O_5$ per liter of wet resin.

5. The process of claim 1 in which the $V_2O_5$ content of the initial, leach liquor is from 2.5 to 5.0 grams per liter.

6. The process of claim 1 in which the pH of the leach liquor is between 1.3 and 1.6.

7. The process of claim 1 in which the retention time per bed of resin does not exceed fifteen minutes.

8. The process of claim 1 in which the leach liquor is initially contacted with the first bed of anion exchange resin at a temperature between 25° and 30° C. and the so treated liquor of reduced vanadium content so obtained is subsequently contacted with other beds of anion exchange resin at temperatures between 50° and 70° C.

References Cited in the file of this patent

UNITED STATES PATENTS 2,359,902    Dahlberg _____ Oct. 10, 1944

FOREIGN PATENTS 109,077    Great Britain _____ Aug. 27, 1917

OTHER REFERENCES

McLean et al.: U.S. Atomic Energy Commission, publication ACCO–63, July 30, 1954 (pages 26 and 27–29 especially).

Abrams et al.: U.S. Atomic Energy Commission, publication ACCO–53, July 10, 1954.

Sussman et al.: "Industrial and Engineering Chemistry," vol. 37, No. 7, pages 618–624, July 1945.

Newkirk et al.: "Industrial and Engineering Chemistry," vol. 41, No. 3, March 1949, pages 452–457.

Salmon et al.: "Journal of the Chemical Society" (1952), pp. 2324–2326.